United States Patent [19]

Kawaguchi

[11] Patent Number: 4,916,560
[45] Date of Patent: Apr. 10, 1990

[54] RECORDING SPEED DETECTING APPARATUS

[75] Inventor: Shintaro Kawaguchi, Kawasaki, Japan

[73] Assignee: Kabushiki Kaisha Toshiba, Kawasaki, Japan

[21] Appl. No.: 172,468

[22] Filed: Mar. 24, 1988

[30] Foreign Application Priority Data

Mar. 28, 1987 [JP] Japan .................................. 62-74836

[51] Int. Cl.⁴ .............................................. G11B 15/46
[52] U.S. Cl. ................................ 360/73.09; 360/73.11
[58] Field of Search ............... 360/73.01, 73.04, 73.05, 360/73.08, 73.09, 73.11, 73.14, 69, 71

[56] References Cited

U.S. PATENT DOCUMENTS 4,695,781  9/1987  Ito ..................................... 360/73.09
4,811,130  3/1989  Takayama ......................... 360/73.11

FOREIGN PATENT DOCUMENTS 0125257  7/1983  Japan ................................. 360/73.09

Primary Examiner—David J. Severin
Attorney, Agent, or Firm—Finnegan, Henderson, Farabow, Garrett and Dunner

[57] ABSTRACT

An apparatus for detecting the speed at which a recording medium was written is provided. While reading the medium, the ratio of the frequency of a control signal, recorded with constant frequency, to the frequency of rotation frequency of a motor for driving the medium is compared to a reference value to determine a recording speed. The determined speed is time sequentially stored in a storing circuit. A recording speed is detected whenever the determined speed obtained in the previous cycle, and stored in the storing circuit, coincides with the determined speed of the current cycle.

10 Claims, 4 Drawing Sheets

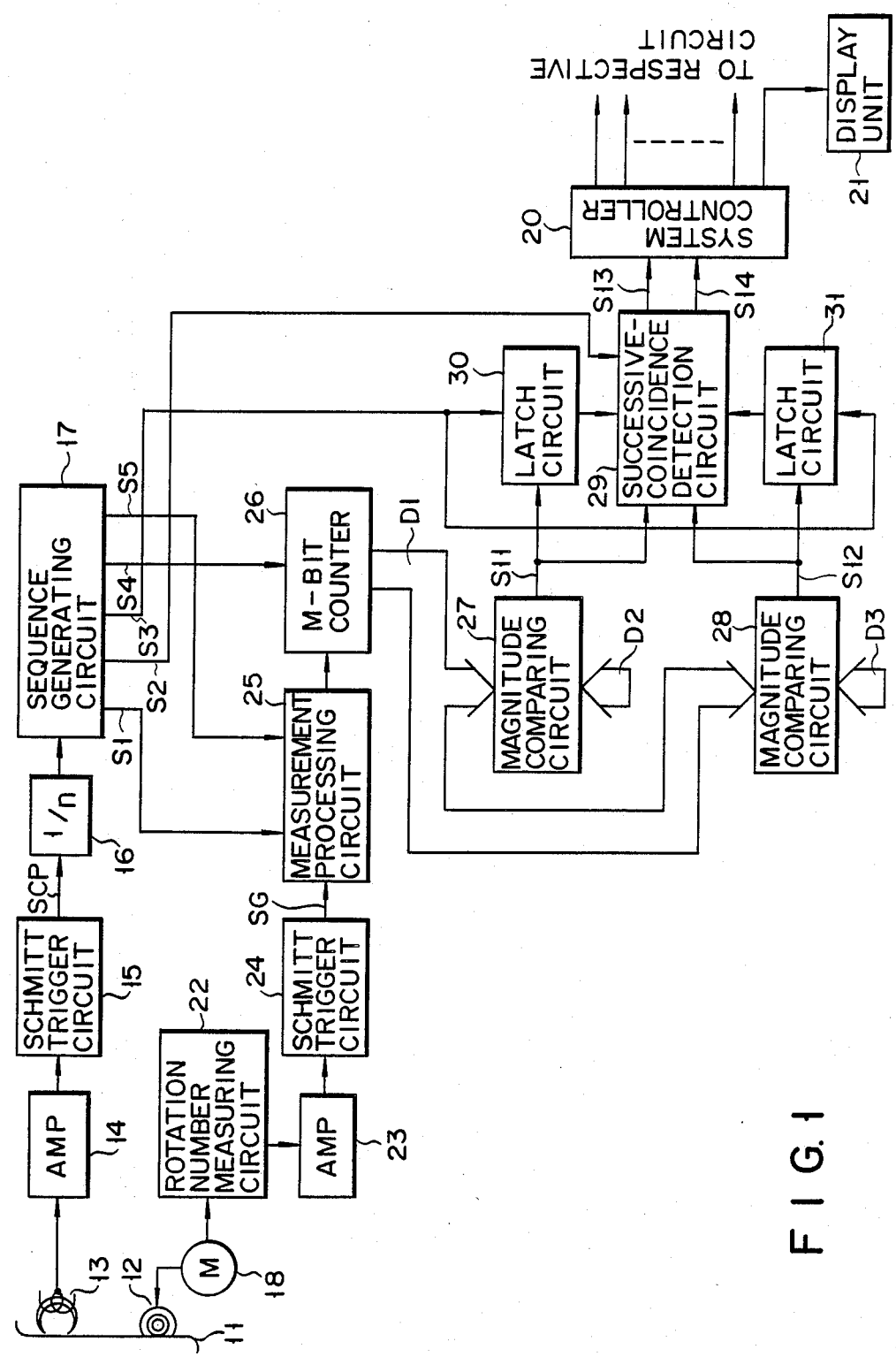
F I G. 1

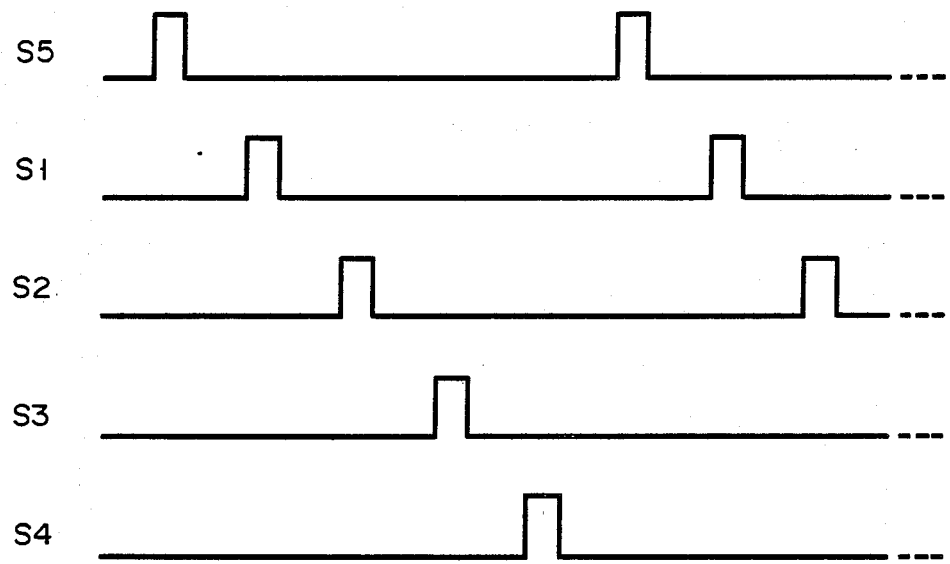
F I G. 2

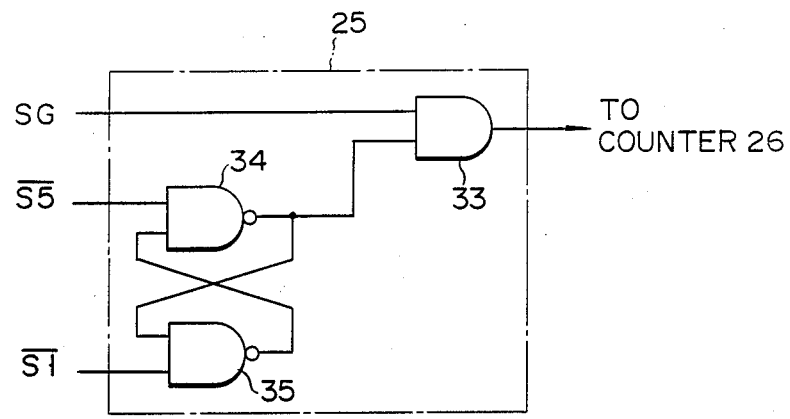
F I G. 3
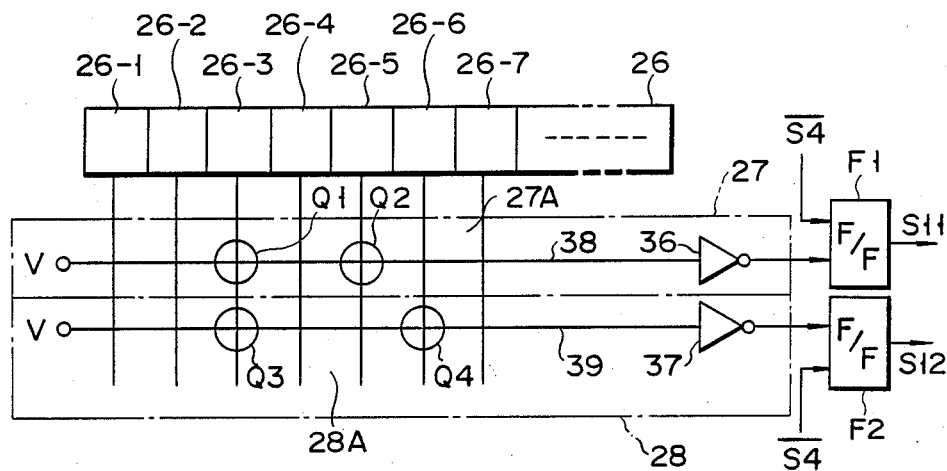
F I G. 4

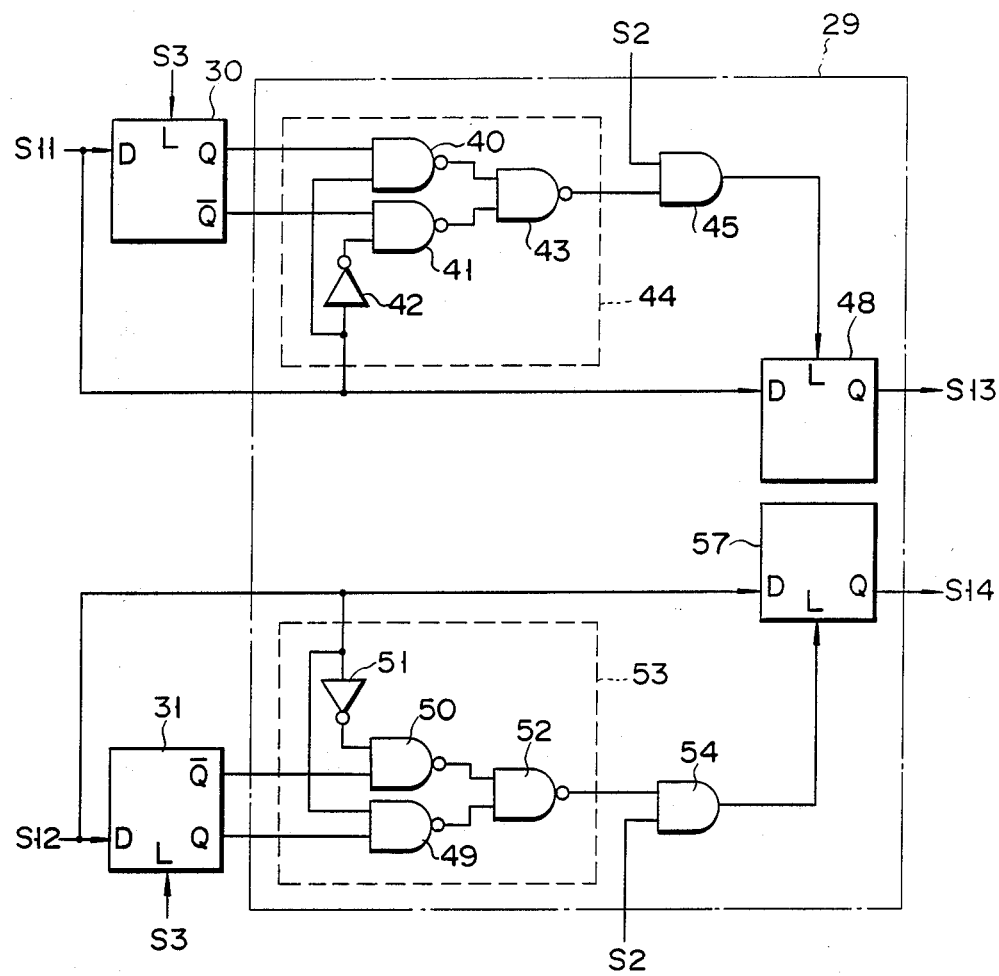
F I G. 5

RECORDING SPEED DETECTING APPARATUS

BACKGROUND OF THE INVENTION

1. Field of the Invention

This invention relates to a recording medium reproducing device such as a video tape recorder (which is hereinafter referred to as a VTR), and more particularly to a recording speed detecting device for detecting the driving speed of the recording medium in the recording operation.

2. Description of the Related Art

In a general VTR for home use, the helical scanning recording-reproducing system employing a rotating magnetic head is used. A cassette type tape is used as the magnetic tape for the VTR. The VTR can be selectively set to two or more different recording modes in which the same tape can be used over different periods of recording time. For example, in the VHS type VTR, three modes including SP (standard play) mode, LP (long play) mode and EP (extra play) mode can be selectively set.

In such a VTR, in order to obtain a normal picture in the reproduction operation, it is necessary to coincide the tape driving speed in the reproducing operation (which is hereinafter referred to as the reproduction speed) with the tape driving speed in the recording operation (which is hereinafter referred to as the recording speed). It would be troublesome for the operator to set the reproduction speed in coincidence with the recording speed, and therefore various recording speed determining devices which can automatically determine the recording speed of the magnetic tape and set the reproduction speed to the corresponding value have been provided.

One of the methods for automatically determining the recording speed of the magnetic tape is disclosed in Japanese Patent Disclosure (Kokai) 60-231,940. The method disclosed in the Japanese Patent Disclosure is explained below. First, a control pulse signal of a predetermined frequency is recorded on the magnetic tape. Next, the ratio of the reproduction output frequency of the pulse signal and the frequency of a rotation frequency signal of the capstan motor in the reproduction mode is detected. Then, the result of detection is compared with two reference values at least three times, and the results of comparison effected at least three times are time sequentially recorded. Finally, the recording speed of the magnetic tape is determined by the majority of the recorded results.

However, in order to exactly determine the recording speed based on the determination method described above, it is necessary to record at least three results of detection of the recording speed. For this reason, at least three stage storing circuits such as shift registers are necessary and time corresponding to that for determining the recording speed at the three stages is required in order to determine the recording speed of the magnetic tape. Of course, this is not preferable from the standpoint of reduction in size and high speed operation of the VTR. Therefore, it has been required to develop a recording speed determination device which can be formed of less constituents and determine the recording speed in a short period of time.

When, for example, three-stage shift registers are used, an erroneous determination may be made under certain conditions. For example, when erroneous data is extracted at every other stage, determining sections at the first and third stages may make an erroneous determination. Therefore, a determination error will occur despite the use of majority rule in order to reduce the possibility of error determination.

SUMMARY OF THE INVENTION

An object of this invention is to provide a recording speed detecting device in which the number of constituents, the detecting time and the possibility of erroneous determination can be reduced.

In order to achieve the above object, according to an aspect of the present invention an apparatus for detecting the speed at which a recording medium was written comprises a frequency ratio detecting means for detecting the ratio of the rotation frequency of a motor for driving a recording medium to the frequency of a reproduction control signal recorded with a constant frequency on the recording medium; a means, responsive to the frequency ratio detecting means, for determining a speed of the recording medium at the time of the recording operation, including at least one means for comparing the frequency ratio with at least one predetermined reference value; a storing means responsive to the speed determining means for time sequentially storing the determined speed; a cycling means for repeatedly activating the frequency ratio detecting means, speed determining means, and storing means; and a checking means, responsive to the recording speed determining means and to the storing means, for successively checking whether or not the speed determined in a preceding cycle and stored in the storing means coincides with the speed determined in the current cycle and detecting a recording speed at the time of recording operation based on the checking result.

In the present embodiment, the frequency ratio of the rotation frequency of the motor for driving the recording medium to the frequency of a reproduction control signal recorded with a constant frequency on the recording medium is detected. The result of determined recording speed derived by comparing the frequency ratio detection result with the reference value is time sequentially stored in the storing circuit and whether or not the detection result of the preceding cycle stored in the storing circuit coincides with the present detection result is checked in successive cycles so as to detect the recording speed at the time of recording operation. In this case, since only one determination result of the recording speed is stored in each cycle, the number of constituents of the storing circuit can be reduced in comparison with the conventional case. Further, since the final detecting is made based on the two determination results of the recording speed, the detecting time can be reduced. In addition, since the detecting is effected by comparing the preceding determination result of the recording speed with the present determination result of the recording speed, a detecting error will not occur when erroneous data is extracted unless erroneous data is also extracted in the successive cycle.

BRIEF DESCRIPTION OF THE DRAWINGS

FIG. 1 is a block diagram showing the construction of a recording speed detecting device according to one embodiment of this invention;

FIG. 2 is a timing chart of timing signals generated from a sequence generating circuit of the circuit shown in FIG. 1;

FIG. 3 is a circuit diagram showing the construction of a measurement processing circuit in the circuit of FIG. 1;

FIG. 4 is a circuit diagram showing the construction of a magnitude comparing circuit in the circuit of FIG. 1; and FIG. 5 is a circuit diagram showing the construction of a successive coincidence determining circuit in the circuit of FIG. 1.

DETAILED DESCRIPTION OF THE PREFERRED EMBODIMENTS

FIG. 1 is a block diagram showing the construction of a recording speed detecting device according to one embodiment of this invention. In the FIG. 1 circuit, only those portions which are necessary for the recording speed detecting device in the VTR are shown, and those portions which are not directly associated with the operation of the recording speed detecting device are omitted.

Magnetic tape 11 includes audio track, video track and control track, and is driven by means of capstan 12. Control head 13 is provided in contact with the control track of magnetic tape 11. A control signal recorded on the control track of magnetic tape 11 is read out by means of control head 13, and the readout control signal is amplified by amplifier 14. Reproduction output SCP of the control pulse signal is extracted from the amplified signal from amplifier 14 by means of Schmitt trigger circuit 15. Reproduction signal SCP is a signal of 30 Hz, for example, when magnetic tape 11 is recorded in the SP mode. The frequency of reproduction signal SCP is divided by n, for example, 2 so as to be set to 15 Hz by means of frequency dividing circuit 16. The signal of 15 Hz is supplied to sequence generating circuit 17 which sequentially generates timing signals S1 to S5 based on the frequency-divided signal of 15 Hz. Timing signals S1 to S5 are pulse signals which are sequentially set to "H" level in the order of S5, S1, S2, S3, S4, S5, S1, S2, --- as shown in FIG. 2.

Capstan motor 18 is used to drive capstan 12, and the rotation number of capstan motor 18 is measured by means of rotation number measuring circuit 22 whose output signal is amplified by amplifier 23. In general, capstan motor 18 includes a frequency generator and it is possible to supply an output signal of the frequency generator to amplifier 23. Schmitt trigger circuit 24 produces rotation frequency signal (which is hereinafter referred to as FG signal) SG of capstan motor 18 at the time of reproduction based on the output signal of rotation number measuring circuit 22. FG signal SG from Schmitt trigger circuit 24 and timing signals S1 and S5 from sequence generating circuit 17 are supplied to measurement processing circuit 25 which in turn supplies FG signal SG to m-bit counter 26 during a time from the rise of timing signal S5 to the rise of timing signal S1. The frequency of FG signal SG is set to a different value according to the recording speed. For example, it is set to 720 Hz in the SP mode of the VHS type VTR, 360 Hz in the LP mode, and 240 Hz in the EP mode.

FG signal SG from measurement processing circuit 25 is counted by means of m-bit counter 26. Thus, counter 26 counts a value corresponding to the frequency ratio of reproduction signal SCP of th control pulse signal and FG signal SG. Therefore, data D1 constituted by upper n bits of the count is set to 48 in the SP mode, 24 in the LP mode and 16 in the EP mode in the normal condition.

Data D1 from counter 26 is supplied as one input data to magnitude comparing circuits 27 and 28 which are respectively connected to receive predetermined reference data D2 and D3 as the other input data. For example, reference data D2 is set to 36 and reference D3 is set to 20. That is, the value of data D2 is set equal to an intermediate value between value 48 of data D1 generated from counter 26 in the SP mode in the normal condition and value 24 of data D1 generated from counter 26 in the LP mode. The value of data D3 is set equal to an intermediate value between value 24 of data D1 generated from counter 26 in the LP mode in the normal condition and value 16 of data D1 generated from counter 26 in the EP mode.

Magnitude comparing circuits 27 and 28 compare data D1 from counter 26 with reference data D2 and D3 so as to determine a mode of recording speed. The result of mode determination is output as one-bit determination signals S11 and S12. In other words, magnitude comparing circuit 27 compares data D1 with data D2, and generates determination signal S11 of "L" level when "D1>D2" is detected, and determination signal S11 of "H" level when "D1<D2" is detected. Likewise, magnitude comparing circuit 28 compares data D1 with data D3, and generates determination signal S12 of "L" level when "D1>D3" is detected, and determination signal S12 of "H" level when "D1<D3" is detected.

Successive-coincidence determination circuit 29 is connected to receive determination signals S11 and S12, latch outputs from latch circuits 30 and 31, and timing signal S2 from sequence generating circuit 17. Determination signal S11 and signal S3 are supplied to one-bit latch circuit 30 which latches determination signal S11 at a timing defined by signal S3. Likewise, determination signal S12 and signal S3 are supplied to one-bit latch circuit 31 which latches determination signal S12 at a timing defined by signal S3. Successive-coincidence determination circuit 29 checks whether or not the latched outputs in latch circuits 30 and 31 coincide with determination signals S11 and S12 generated from comparing circuits 27 and 28 in the following cycle, and produces signals S13 and S14 specifying the reproduction speed base on the checking result. That is, successive-coincidence determination circuit 29 produces the detection results based on determination signals S11 and S12 as detection signals S13 and S14 at a timing determined by signal S2 when determiantion signals S11 and S12 generated in the preceding cycle and latched in latch circuits 30 and 31 coincide with determination signals S11 and S12 obtained in the present cycle. If determination signals S11 and S12 generated in the preceding cycle and latched in latch circuits 30 and 31 do not coincide with determination signals S11 and S12 obtained in the present cycle, it continues to produce detecting signals S13 and S14 which were generated in the preceding cycle.

System controller 20 detects the recording mode based on detecting signals S13 and S14 generated from successive-coincidence determination circuit 29. That is, the recording mode is detected as the SP mode when detection signals S13 and S14 are both at "L" level, the LP mode when detection signals S13 and S14 are respectively at "H" and "L" levels, and the EP mode when detection signals S13 and S14 are both at "H"

level. Display unit 21 displays the result of mode detection by system controller 20.

The contents of m-bit counter 26 is cleared at a timing of signal S4, and then it starts to count FG signal SG based on timing signals S5 and S1 generated from sequence generating circuit 17.

Since latch circuits 30 and 31 can be constructed to store one-bit data, the number of parts for constituting the same can be reduced in comparison with the prior art case. Further, since successive-coincidence determination circuit 29 uses only two determination signals of the recording speed in order to detect the mode, the total detectig time becomes equal to time required for effecting the mode determining operation two times and can be reduced in comparison with the conventional circuit.

When a pulse is accidentally extracted from reproduction output SCP in the control pulse signal, causing one erroneous result, a correct detection result obtained in a preceding cycle is generated as a detection output. Further, even if every other pulse is extracted from reproduction output SCP in the control pulse signal, it is possible to continuously provide correct detection results. In other words, it is possible to continuously provide correct detection results unless pulses are successively extracted, thus considerably reducing the possibility of causing erroneous detection.

FIG. 3 shows the construction of measurement processing circuit 25 in the circuit of FIG. 1. Measurement processig circuit 25 is constituted by AND gate 33, and NAND gates 34 and 35. NAND gate 34 is connected to receive inverted signal $\overline{S5}$ of timing signal S5 from sequence generating circuit 17 at one input terminal and an output signal from NAND gate 35 at the other input terminal. NAND gate 35 is connected to receive inverted signal $\overline{S1}$ of timing signal S1 from sequence generating circuit 17 at one input terminal and an output signal from NAND gate 34 at the other input terminal. NAND gates 34 and 35 are combined to constituted a flip-flop. AND gate 33 is connected to receive FG signal SG from Schmitt trigger circuit 24 at one input terminal and an output signal from NAND gate 34 at the other input terminal. An output signal from AND gate 33 is supplied to the signal input terminal of m-bit counter 26.

The flip-flop constituted by NAND gates 34 and 35 is set in response to timing signal $\overline{S5}$ and reset in response to timing signal $\overline{S1}$. FG signal is generated from AND gate 33 during a time from the fall of signal $\overline{S5}$ to the fall of signal $\overline{S1}$ in which the flip-flop is kept in the set condition.

FIG. 4 shows the construction of magnitude comparison circuits 27 and 28 in the circuit of FIG. 1. In the FIG. 4 circuit, a ROM storing reference data D2 and D3 is used for the operation of comparing data D1 with data D2 and D3. Comparison circuit 27 is constituted by ROM section 27A and inverter 36, and comparison circuit 28 is constituted by ROM section 28A and inverter 37. In this case, output signals of third bit 26-3 and fifth bit 26-5 of ROM section 27A are supplied to the gates of transistors Q1 and Q2 of ROM section 27A. Transistors Q1 and Q2 are connected in series with signal line 38 which is connected at one end to power source V. The other end of signal line 38 is connected to the input terminal of inverter 36. Set terminal of flip-flop F1 is connected to receive output terminal of inverter 36. Reset terminal of flip-flop F1 is connected receive timing signal $\overline{S4}$ which supplies detection signal S11 to latch circuit 30. Output signals of third bit 26-3 and sixth bit 26-6 of counter 26 are supplied to the gates of transistors Q3 and Q4 of ROM section 28A. Transistors Q3 and Q4 are connected in series with signal line 39 which is connected at one end to power source V. The other end of signal line 39 is connected to the input terminal of inverter 37. Set terminal of flip-flop F2 is connected to receive output terminal of inverter 37. Reset terminal of flip-flop F2 is connected to receive timing signal $\overline{S4}$ which supplies detection signal $\overline{S12}$ to latch circuit 31.

In the case where output signals of third bit 26-3 and fifth bit 26-5 of counter 26 are both set at "1" level, transistors Q1 and Q2 are turned on. This causes a "H" level signal of power source V to be supplied to the set terminal of flip-flop F1 via transistors Q1 and Q2, and inverter 36, thereby setting signal S11 to "H" level. Signal S11 is reset at "L" level in response to timing signal $\overline{S4}$. Likewise, in the case where output signals of third bit 26-3 and sixth bit 26-6 of counter 26 are both set at "1" level, transistors Q3 and Q4 are turned on. This causes a "H" level signal of power source V to be supplied to the set terminal of flip-flop F2 via transistors Q3 and Q4, and inverter 37, thereby setting signal S12 to "H" level. Signal S12 is reset at "L" level in response to timing signal $\overline{S4}$.

With the comparing circuit described above, a comparison of data D1 with reference data D2 and D3 can be effected by use of a construction simpler than in the case where an output signal of counter 26 is directly compared with data D1 and D2. In the FIG. 4 circuit, a ROM is used, but a combination of logic gates can be used to construct a comparison circuit performing the same operation.

FIG. 5 shows the construction of latch circuits 30 and 31 and successive-coincidence determination circuit 29. Latch circuits 30 and 31 are each formed of a flip-flop. Data input terminal D of flip-flop 30 is connected to receive output signal S11 from comparison circuit 27 and input terminal L is connected to receive timing signal S3 from sequence generating circuit 17. NAND gate 40 is connected at one input terminal to output terminal Q of flip-flop 30 and at the other input terminal to receive output signal S11 from comparison circuit 27. NAND gate 41 is connected at one input terminal to output terminal $\overline{Q}$ of flip-flop 30 and at the other input terminal to receive an output signal from inverter 42. The input terminal of inverter 42 is connected to receive output signal S11 of comparison circuit 27. Two input terminals of NAND gate 43 are connected to receive output signals of NAND gates 40 and 41. NAND gates 40, 41 and 43 and inverter 42 are combined to constitute coincidence detection circuit 44. AND gate 45 is connected at one input terminal to receive an output signal of NAND gate 43 and at the other input terminal to receive timing signal S2 from sequence generating circuit 17. Data input terminal D of flip-flop 48 is connected to receive signal S11 and input terminal L is connected to receive an output signal of AND gate 45. Output signal S13 of flip-flop 48 is supplied to system controller 20.

The circuit for processing signals S12 and S14 is substantially the same as that for processing signals S11 and S13. That is, data input terminal D of flip-flop 31 is connected to receive output signal S12 of comparison circuit 28 and input terminal L is connected to receive timing signal S3 from sequence generating circuit 17. NAND gate 49 is connect at one input terminal to output terminal Q of flip-flop 31 and at the other input terminal to receive output signal S12 from comparison circuit 27. NAND gate 50 is connected at one input terminal to output terminal $\overline{Q}$ of flip-flop 31 and at the other input terminal to receive an output signal from inverter 51. The input terminal of inverter 51 is connected to receive output signal S12 of comparison circuit 27. Two input terminals of NAND gate 52 are connected to receive output signals of NAND gates 49 and 50. NAND gates 49, 50 and 52 and inverter 51 are combined to constitute coincidence detection circuit 53. AND gate 54 is connected at one input terminal to receive an output signal of NAND gate 52 and at the other input terminal to receive timing signal S2 from sequence generating circuit 17. Data input terminal D of flip-flop 57 is connected to receive signal S12 and input terminal L is connected to receive an output signal of AND gate 54. Output signal S14 of flip-flop 57 is supplied to system controller 20.

With the construction described above, first signals S11 and S12 generated from magnitude comparing circuits 27 and 28 are latched by means of latch circuits 48 and 57 in synchronism with signal S2, and output as signals S13 and S14. First signals S11 and S12 are also latched by means of latch circuits 30 and 31 in synchronism with signal S3.

Whether or not second signals S11 and S12 subsequently generated from comparison circuits 27 and 28 coincide with first signals S11 and S12 latched in latch circuits 48 and 57 in the previous cycle is checked by means of coincidence detection circuits 44 and 53. For example, in the case where first signals S11 and S12 are at "L" level and second signals S11 and S12 are also at "L" level, Q output signals of "L" level and $\overline{Q}$ output signals of "H" level are generated from latch circuits 30 and 31, and output signals from inverters 42 and 51 are set at "H" level, causing output signals from NAND gates 40 and 49 to be set at "H" level and output signals from NAND gates 41 and 50 to be set at "L" level. As a result, output signals from NAND gates 43 and 52 are both set at "H" level, indicating the coincidence state. In this case, AND gate 45 and 54 are enabled. Therefore, signal S2 is fed via AND gates 45 and 54 to latch circuits 48 and 57, respectively. Thus, second signals S11 and S12 of "L" level are latched in latch circuits 48 and 57. In this way, if "L" level signals are continuously generated as signals S11 and S12, signals S13 and S14 are kept at "L" level.

In the case where signals S11 and S12 happen to be set at "H" level because of extraction of pulse, for example, output signals from NAND gates 40, 41, 49 and 50 are all set at "H" level, causing output signals from NAND gates 43 and 52 to be set at "L" level to indicate the non-coincidence state. Since, in this case, signal S2 cannot pass via AND gates 45 and 54, latch circuits 48 and 57 continue to output previous signals S11 and S12 of "L" level. That is, even when a pulse or pulses are extracted from reproduction output SCP of the control pulse signal and an erroneous result of determination is caused in one cycle, the previous result of detection which is normal is output as the detection output.

Further, when a pulse is extracted from only one of signals S11 and S12, the same processing as described above is effected to cope with the problem due to the pulse extraction. Also, even when every other pulse is extracted from reproduction output SCP of the control pulse signal, the contents of latch circuits 48 and 57 are not changed and therefore normal detection result can be continuously attained.

As described above, according to this invention, a recording speed detection device can be provided in which the number of constituents and time for detection can be reduced and the possibility of erroneous detection can be suppressed.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicant's general inventive concept.

What is claimed is:

1. An apparatus for detecting the speed at which a recording medium was written comprising:
   frequency ratio detecting means for detecting the ratio of the rotation frequency of a motor for driving a recording medium to the frequency of a reproduction control signal recorded with a constant frequency on the recording medium;
   means, responsive to the frequency ratio detecting means, for determining a speed of the recording medium at the time of the recording operation, including at least one means for comparing the frequency ratio with at least one predetermined reference value;
   storing means responsive to the determining means for time sequentially storing the determined speed;
   cycling means for repeatedly activating the frequency ratio detecting means, determining means, and storing means; and
   checking means, responsive to the recording speed determining means and to the storing means, for successively checking whether or not the speed determined in a preceding cycle and stored in the storing means coincides with the speed determined in the current cycle and detecting a recording speed at the time of recording operation based on the checking result.

2. A recording speed determining device according to claim 1, wherein said storing means includes a latch circuit for latching an output from said speed determining means.

3. A recording speed detecting apparatus according to claim 1, wherein the recording speed determining means includes first magnitude comparing means for comparing a first reference data with the frequency ratio; and second magnitude comparing means for comparing a second reference data with the frequency ratio.

4. A recording speed determining device according to claim 3, wherein said first magnitude comparing means includes a first ROM section storing the first reference data and an inverter for inverting an output from said first ROM section; and said second magnitude comparing means includes a second ROM section storing the second reference data and an inverter for inverting an output from said second ROM section.

5. A recording speed detecting apparatus according to claim 1, wherein said frequency ratio detecting means includes frequency dividing means for calculating a divided frequency from the reproduction control signal recorded on the recording medium;
   sequence generating means responsive to the frequency dividing means for generating predetermined timing signals based on the divided frequency;

measurement processing means responsive to the sequence generating means for gating a rotation frequency signal of the motor based on the timing signals to generate a gated rotation frequency signal; and counting means responsive to the measurement processing means for counting the periods of the gated rotation frequency signal.

6. A recording speed detecting apparatus according to claim 5, wherein said measurement processing means includes a flip-flop which is set or reset based on the timing signals from the sequence generating means; and a logic gate for generating the rotation frequency signal of the motor when said flip-flop is in set condition.

7. A recording speed determining device according to claim 5, wherein the counting means includes an m-bit counter.

8. A recording speed detecting apparatus according to claim 1, wherein the checking means includes coincidence detection means for detecting a coincidence between the recording speed determined in the preceding cycle and stored in said storing means and the recording speed determined in the current cycle; and means for outputting a detected recording speed based on the determination result generated from said speed determining means only when said coincidence detection means detects the coincidence, and for storing said detected recording speed.

9. A recordintg speed detecting apparatus according to claim 8, wherein the recording speed determining means outputs a signal having first and second bits, the storing means outputs a signal having first and second bits, and the coincidence detection means includes a first NAND gate connected at a first input terminal to receive the first bit of the determined recording speed signal and at a second input terminal to receive the first bit of the of the storing means signal; a second NAND gate connected at a first input terminal to receive an inverted first bit of the determined recording speed signal and at a second input terminal to receive an inverted first bit of the storing means signal; a third NAND gate connected to receive output signals from the first and second NAND gates; a fourth NAND gate connected at a first input terminal to receive the second bit of the determined recording speed signal and at a second input terminal to receive the second bit of the of the storing means signal; a fifth NAND gate connected at a first input terminal to receive an inverted second bit of the determined recording speed signal and at a second input terminal to receive an inverted second bit of the storing means signal; a sixth NAND gate connected to receive output signals from the fourth and fifth NAND gates.

10. A recording speed detecting apparatus according to claim 8, wherein the recording speed determining means outputs a signal having first and second bits, and said means for outputting a detected recording speed and for storing said detected speed includes a first AND gate connected at a first input terminal to receive a first output signal of said coincidence detection means and at a second input terminal to receive an output signal of said sequence generating means; a first latch circuit connected at a data input terminal to receive the first bit of the determined recording speed signal of said speed determining means and controlled by an output signal of said first AND gate; a second AND gate connected at a first terminal to receive a second output signal of said coincidence detection means and at a second input terminal to receive an output signal of said sequence generating means; and a second latch circuit connected at a data input terminal to receive a second bit of the determined recording speed signal of said speed detecting means and controlled by an output signal of said second AND gate.

* * * * *